(12) United States Patent
Loiko et al.

(10) Patent No.: US 11,695,876 B2
(45) Date of Patent: Jul. 4, 2023

(54) ECHO DETECTION

(71) Applicant: Google LLC, Mountain View, CA (US)

(72) Inventors: Alexandre Loiko, Mountain View, CA (US); Marcus Wirebrand, Huddinge (SE); Samuel Martin Zackrisson, Mountain View, CA (US); Ivo Creusen, Stockholm (CA); Mans Gustaf Sebastian Ullberg, Mountain View, CA (US); Alessio Bazzica, Järfälla (SE); Daniel Johansson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/450,014

(22) Filed: Oct. 5, 2021

(65) Prior Publication Data
US 2022/0030116 A1 Jan. 27, 2022

Related U.S. Application Data

(63) Continuation of application No. 17/260,219, filed as application No. PCT/US2019/042208 on Jul. 17, 2019, now Pat. No. 11,418,655.

(Continued)

(51) Int. Cl.
*H04M 9/08* (2006.01)
*G10L 21/0208* (2013.01)

(52) U.S. Cl.
CPC ......... *H04M 9/082* (2013.01); *G10L 21/0208* (2013.01); *G10L 2021/02082* (2013.01)

(58) Field of Classification Search
CPC ...... H04M 9/082; H04B 3/23; G10L 21/0208; G10L 2021/02082; G10L 21/0216
(Continued)

(56) References Cited

U.S. PATENT DOCUMENTS

| 9,912,373 B1 | 3/2018 | Wang |
| 9,916,840 B1 | 3/2018 | Do et al. |

(Continued)

FOREIGN PATENT DOCUMENTS

| JP | H10145888 A | 5/1998 |
| JP | 2006352450 A | 12/2006 |

(Continued)

OTHER PUBLICATIONS

Office Action for related KR application No. 10-2021-7004098 dated Apr. 7, 2022.
(Continued)

*Primary Examiner* — Md S Elahee
(74) *Attorney, Agent, or Firm* — Honigman LLP; Brett A. Krueger

(57) ABSTRACT

A method includes receiving a microphone audio signal and a playout audio signal, and determining a frequency representation of the microphone audio signal and a frequency representation of the playout audio signal. For each frequency representation, the method also includes determining features based on the frequency representation. Each feature corresponds to a pair of frequencies of the frequency representation and a period of time between the pair of frequencies. The method also includes determining that a match occurs between a first feature based on the frequency representation of the microphone audio signal and a second feature based on the frequency representation of the playout audio signal, and determining that a delay value between the first feature and the second feature corresponds to an echo within the microphone audio signal.

20 Claims, 10 Drawing Sheets

Related U.S. Application Data

(60) Provisional application No. 62/700,138, filed on Jul. 18, 2018.

(58) Field of Classification Search
USPC .................................................. 379/406.08
See application file for complete search history.

(56) References Cited

U.S. PATENT DOCUMENTS

| | | |
|---|---|---|
| 2008/0170706 A1 | 7/2008 | Faller |
| 2017/0214800 A1 | 7/2017 | Nagai |

FOREIGN PATENT DOCUMENTS

| | | |
|---|---|---|
| JP | 2013012841 A | 1/2013 |
| JP | 2016076860 A | 5/2016 |
| JP | 2016152455 A | 8/2016 |

OTHER PUBLICATIONS

Japanese Patent Office, Office Action for Application 2021-502539, dated Feb. 2, 2022.
International Search Report, PCT Application No. PCT/US2019/042208 dated Sep. 19, 2019.

ECHO DETECTION

TECHNICAL FIELD

This disclosure relates to echo detection.

BACKGROUND

As audio systems capture and transmit audio, these peripheral devices may be subject to acoustic echo. Acoustic echo generally occurs when an audible signal generated from an audio playout device (e.g., a speaker) propagates in the form of an acoustic wave through an acoustic environment (e.g., air) and a modified version of the wave reflects back into a microphone. Another form of echo is electrical echo, which takes place because of undesired electrical coupling effects between the audio playout device (e.g., a speaker) and the microphone. The signal generated by such echo paths then becomes transmitted as an audio echo. Echoes may result due to various factors, such as, for example, a proximity of peripherals or a quality of peripherals.

As echo occurs within a conversation, such as a real-time communication (RTC) using a software application, the echo generates a negative effect on a user experience. Although the echo may be attributable to non-software issues, such as hardware compatibility or hardware quality, a user often may associate this negative experience with the software application used for communication (e.g., a RTC application). As people increasingly communicate using systems subjected to echo, echo detection systems and methods may be implemented to understand the audio interaction within these communication systems.

SUMMARY

One aspect of the disclosure provides a method that includes receiving, at data processing hardware, a microphone audio signal and a playout audio signal, and determining, by the data processing hardware, a frequency representation of the microphone audio signal and a frequency representation of the playout audio signal. For each frequency representation, the method also includes determining, by the data processing hardware, features based on the frequency representation. Each feature corresponds to a pair of frequencies of the frequency representation and a period of time between the pair of frequencies. The method also includes determining, by the data processing hardware, that a match occurs between a first feature based on the frequency representation of the microphone audio signal and a second feature based on the frequency representation of the playout audio signal. The method also includes determining, by the data processing hardware, that a delay value between the first feature and the second feature corresponds to an echo within the microphone audio signal.

Implementations of the disclosure may include one or more of the following optional features. In some implementations, determining that the delay value corresponds to the echo includes determining that the delay value between the first feature and the second feature satisfies an echo threshold, the echo threshold representing a count of a particular delay value predictive of a respective echo. In additional implementations, the pair of frequencies correspond to a first peak frequency and a second peak frequency of the frequency representation. Here, the second peak frequency is adjacent to the first peak frequency and within a threshold frequency difference from the first peak frequency, wherein the threshold frequency difference corresponds to a frequency tolerance from the first peak frequency. The frequency representation may include a spectrogram.

In some examples, receiving the microphone audio signal includes receiving the microphone audio signal as an echo reduced signal from an echo reduction device that is configured to reduce echo between the microphone audio signal and the playout audio signal. Additionally or alternatively, the method may also include down-sampling, by the data processing hardware, each of the received microphone audio signal and the received playout audio signal.

In some implementations, determining the frequency representation of the microphone audio signal and the playout audio signal includes, for each audio signal of the microphone audio signal and the playout audio signal, dividing the audio signal into sample blocks and determining coefficients of the frequency representation based on a frequency transformation of each sample block. In additional implementations, the pair of frequencies corresponding to each feature satisfies a feature frequency threshold. Additionally or alternatively, receiving the microphone audio signal and the playout audio signal, determining the frequency representation of the microphone audio signal and the frequency representation of the playout audio signal, determining the features for each frequency representation, determining that the match matching occurs between the first feature and the second feature, and determining that the delay value between the first feature and the second feature corresponds to the echo occur contemporaneously in real-time. In some examples, the method also includes removing, by the data processing hardware, the received microphone audio signal and the received playout audio signal based on determining the delay value between the first feature and the second feature corresponds to the echo.

Another aspect of the disclosure provides a method that includes receiving, at data processing hardware in real-time, a microphone audio signal and a playout audio signal, and determining, by the data processing hardware in real-time, a first set of playout features from the playout audio signal, the first set of playout features representing a predetermined block of time from the playout audio signal, each playout feature corresponding to a pair of playout audio signal frequencies and a period of time between the pair of playout audio signal frequencies. The method also includes determining, by the data processing hardware in real-time, microphone features corresponding to the received microphone audio signal, each microphone feature corresponding to a pair of microphone audio signal frequencies and a period of time between the pair of microphone audio signal frequencies. The method also includes determining, by the data processing hardware in real-time, whether a match occurs between a playout feature of the first set of playout features and a first microphone feature, and when no match occurs: determining, by the data processing hardware in real time, a second set of playout audio features based the playout audio signal, the second set of playout features representing the predetermined block of time adjacent to the first set of playout features from the playout audio signal; determining, by the data processing hardware in real time, that a respective playout feature from the second set of playout features matches a second microphone feature; and identifying, by the data processing hardware in real time, that the matched second microphone feature is an echo within the microphone audio signal.

This aspect may include one or more of the following optional features. In some examples, receiving the microphone audio signal further includes receiving the microphone audio signal as an echo reduced signal from an echo reduction device (140). In these examples, the echo reduction device is configured to reduce echo between the microphone audio signal and the playout audio signal.

Yet another aspect of the disclosure provides a system that includes data processing hardware and memory hardware in communication with the data processing hardware. The memory hardware stores instructions that when executed on the data processing hardware cause the data processing hardware to perform operations that include receiving a microphone audio signal and a playout audio signal, and determining a frequency representation of the microphone audio signal and a frequency representation of the playout audio signal. For each frequency representation, the method also includes determining features based on the frequency representation. Each feature corresponds to a pair of frequencies of the frequency representation and a period of time between the pair of frequencies. The method also includes determining that a match occurs between a first feature based on the frequency representation of the microphone audio signal and a second feature based on the frequency representation of the playout audio signal. The method also includes determining that a delay value between the first feature and the second feature corresponds to an echo within the microphone audio signal.

This aspect may include one or more of the following optional features. In some implementations, determining that the delay value corresponds to the echo includes determining that the delay value between the first feature and the second feature satisfies an echo threshold, the echo threshold representing a count of a particular delay value predictive of a respective echo. In additional implementations, the pair of frequencies correspond to a first peak frequency and a second peak frequency of the frequency representation. Here, the second peak frequency is adjacent to the first peak frequency and within a threshold frequency difference from the first peak frequency, wherein the threshold frequency difference corresponds to a frequency tolerance from the first peak frequency. The frequency representation may include a spectrogram.

In some examples, receiving the microphone audio signal includes receiving the microphone audio signal as an echo reduced signal from an echo reduction device that is configured to reduce echo between the microphone audio signal and the playout audio signal. Additionally or alternatively, the operations may also include down-sampling each of the received microphone audio signal and the received playout audio signal.

In some implementations, determining the frequency representation of the microphone audio signal and the playout audio signal includes, for each audio signal of the microphone audio signal and the playout audio signal, dividing the audio signal into sample blocks and determining coefficients of the frequency representation based on a frequency transformation of each sample block. In additional implementations, the pair of frequencies corresponding to each feature satisfies a feature frequency threshold. Additionally or alternatively, receiving the microphone audio signal and the playout audio signal, determining the frequency representation of the microphone audio signal and the frequency representation of the playout audio signal, determining the features for each frequency representation, determining that the match matching occurs between the first feature and the second feature, and determining that the delay value between the first feature and the second feature corresponds to the echo occur contemporaneously in real-time. In some examples, the operations also include removing the received microphone audio signal and the received playout audio signal based on determining the delay value between the first feature and the second feature corresponds to the echo.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
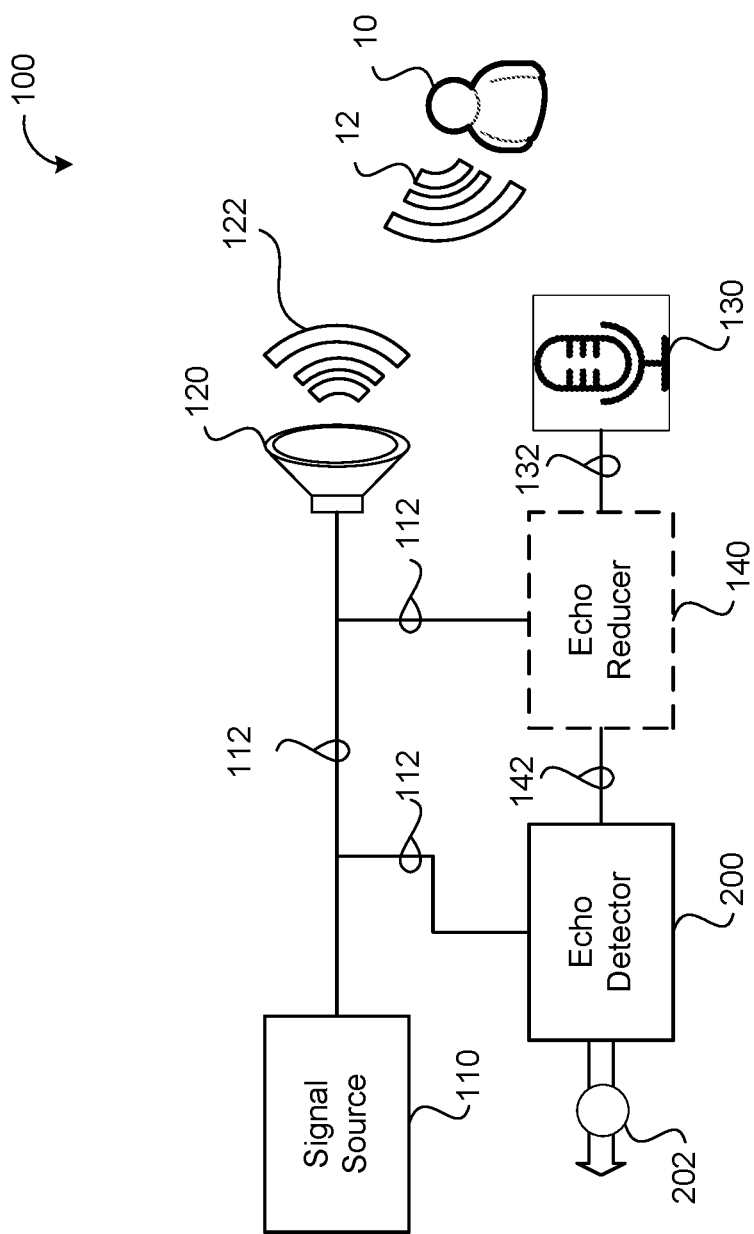
FIG. 1 is a schematic view of an example of an echo detection system.

FIG. 1 is an example of an echo detection system 100. The echo detection system 100 generally includes a signal source 110, an audio playout device 120, a microphone 130, and an echo detector 200. The echo detection system 100 is an environment where a user 10 receives playout audio 122 from an audio playout device 120 (e.g., a speaker) and the microphone 130 receives a modified version of the playout audio 122 as an echo. The microphone 130 is configured to capture speech 12 or other audible sound generated by the user 10, which may result in capturing echo. For example, in a conversation between a first user 10 and a second user using a real-time communication (RTC) application, the second user conversing with the first user 10 may subsequently receive audio containing both the echo and the captured speech 12 as well as provide to the first user 10 playout audio 122 that includes an echo from a system (e.g., the signal source 110) of the second user. In this situation, echo received by either user (e.g., the first user 10 or the second user) negatively impacts the user's experience. In turn, a user 10 may associate this negative experience with, for example, an RTC application even though the echo may be caused by other means, such as hardware (e.g., a speaker and a microphone). In order to combat these negative effects, the echo detection system 100 includes the echo detector 200 to understand the echo occurring within the echo detection system 100. Although the echo detection system 100 is generally described from the perspective of acoustic echo with, for example, an audio playout device 120 and a microphone 130, the echo detection system 100 may be equally applicable to determine electrical echo (e.g., line echo) occurring from electrical coupling effects within an audio system.

For simplification, FIG. 1 depicts one side of a conversation involving the user 10. Here, the signal source 110 may generally refer to any source capable of providing a playout audio signal 112. For example, the signal source 110 may be a second microphone or a processor associated with a second microphone 130 that captures speech from a second user conversing with the first user 10.

The audio playout device 120 is a device configured to translate an electrical signal into an audible sound (i.e. audio). For example, FIG. 1 illustrates the audio playout device 120 as a speaker. Here, the playout audio signal 112 is the electrical signal converted by the audio playout device 120 into playout audio 122 for the user 10 and/or user environment.

The microphone 130 generally refers to a device that converts audible sound into an electrical signal. In the echo detection system 100 of FIG. 1, the microphone 130 converts audio sound from the user 10 and/or the audio playout device 120 into a microphone audio signal 132. The audio sound from the user 10 may be speech 12 or other audible sound from the user 10, while the audio sound from the audio playout device 120 refers to at least a portion of the playout audio 122.

In some examples, the echo detection system 100 also includes an echo reducer 140. The echo reducer 140 is an echo reduction device configured to reduce (e.g., by suppression) or cancel echo prior to the echo detector 200. The echo reducer 140 generates, as an output, a reduced signal 142 based on a signal input (e.g., the microphone audio signal 132). The reduced signal 142 refers to the signal output of the echo reducer 140 regardless of whether the echo reducer 140 actually modifies the input signal (e.g., the microphone audio signal 132) or not. For example, the echo reducer 140 may determine not to modify the microphone audio signal 132 in some scenarios. Although the echo reducer 140 may seek to cancel or to remove echo, often this echo removal process is imperfect and results in some degree of residual echo. In these examples, the echo detector 200 detects residual echo in the reduced signal 142 output from the echo reducer 140. In other words, the echo detector 200 may identify or monitor an effectiveness of the echo reducer 140. Here, residual echo detected by the echo detector 200 subsequent to the echo reducer 140 may provide feedback for the echo reducer 140 or an entity administering the echo reducer 140. For example, the echo reducer 140 or an entity administering the echo reducer 140 receives the feedback from the echo detector 200 and updates parameters of the echo reducer 140 to optimize or to further minimize an amount of residual echo remaining within the reduced signal 142 from the echo reducer 140. Additionally or alternatively, the echo reducer 140 may implement a model (e.g., a machine learning model or a neural network model) based on the feedback from the echo detector 200 to, for example, minimize the residual echo in the reduced signal 142 in real-time within the echo detection system 100.

In some examples, the echo detector 200 provides feedback regarding the detected echo (e.g., the residual echo) to the user 10. The echo detector 200 may provide to the user 10 recommendations or hints about how to reduce echo. For instance, the echo detector 200 may recommend using a headset to the user 10 or recommend particular hardware to the user 10 (e.g., a certain type of microphone or speaker that generates less echo).

The example of FIG. 1 shows the echo reducer 140 with a dotted outline to indicate that the echo detector 200 may detect echo in an echo detection system 100 with or without the presence of the echo reducer 140. The echo reducer 140 may be hardware and/or software used to improve the quality of an audio signal by removing or reducing echo. Some examples of echo reducers 140 are devices for acoustic echo suppression (AES), acoustic echo cancelation (AEC), and/or line echo cancelation (LEC). In some configurations, when the echo detector 200 detects residual echo from the echo reducer 140, the echo detector 200 is configured to control or to recommend control changes to the echo reducer 140. For example, the echo detector 200 switches or recommends switching from a hardware echo reducer 140 to a software echo reducer 140 (or vice versa) based on detected echo from the echo reducer 140.

The echo reducer 140 is positioned with the intent to prevent the creation of echo. In some configurations, the echo reducer 140 is located at, or adjacent to, the microphone 130 to operate in conjunction with the microphone 130 to generate the reduced signal 142 (e.g., an echo suppressed signal or an echo canceled signal) as the microphone audio signal 132. In other configurations (as shown in FIG. 1), the echo reducer 140 is positioned downstream the microphone 130 and receives the microphone audio signal 132 output from the microphone 130 as input and generates the reduced signal 142. Accordingly, the echo reducer 140 may be implemented separately from, or jointly with, the microphone 130.

Figure 2A:
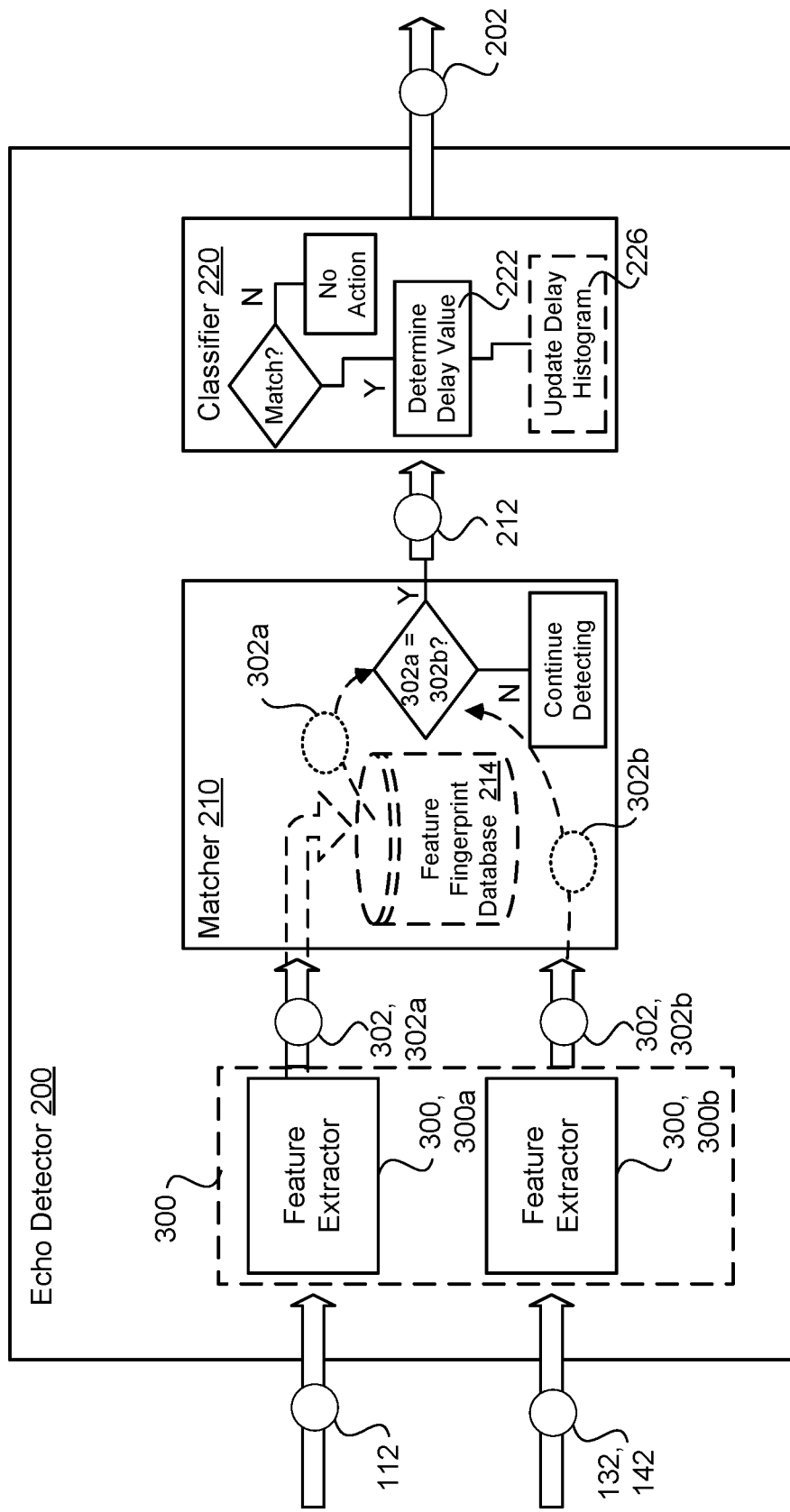
FIGS. 2A and 2B are schematic views of example echo detectors operating within the echo detection system.
Figure 2B:
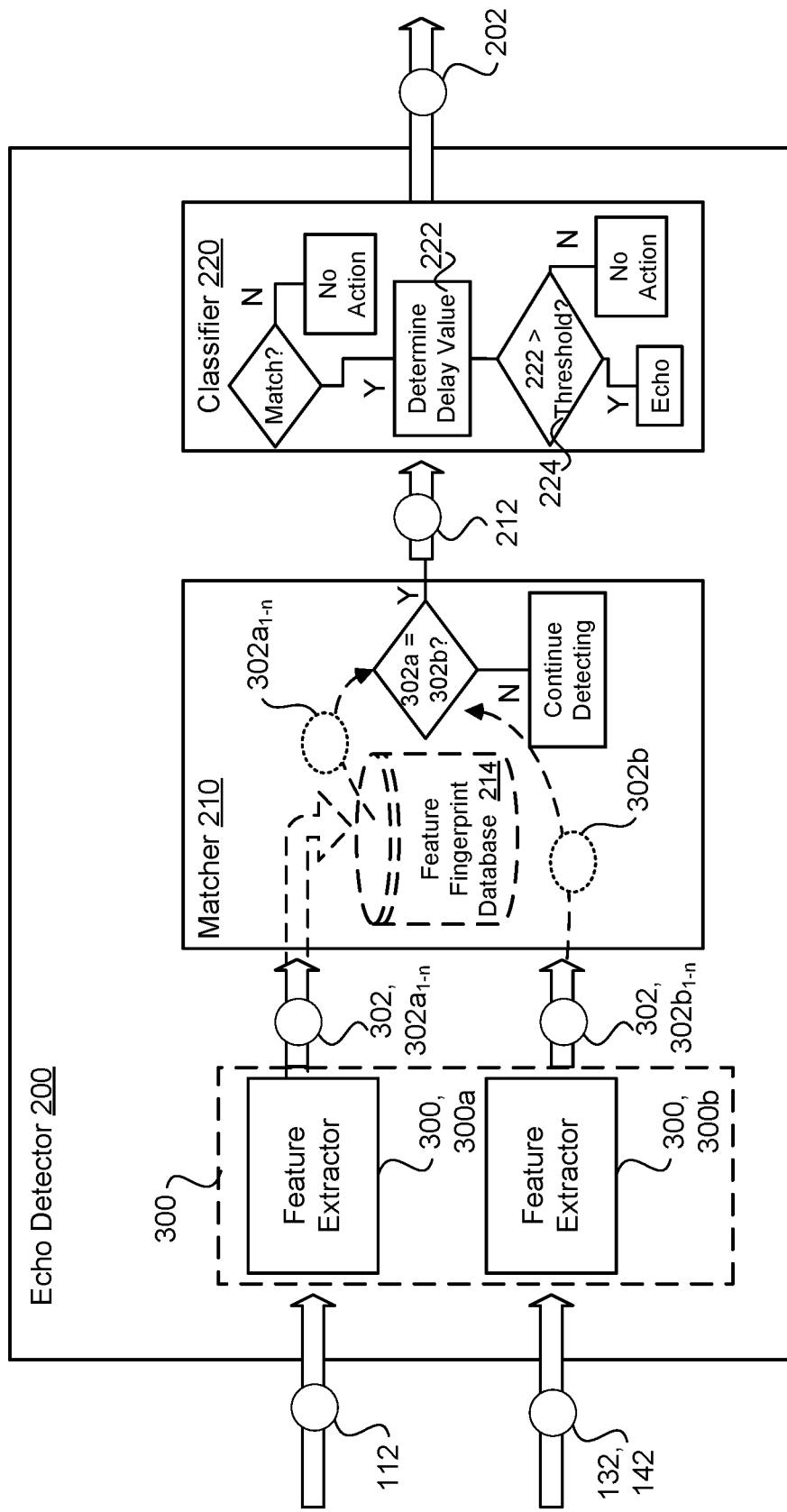

FIGS. 2A and 2B are examples of echo detectors 200. The echo detector 200 is configured to compare the playout audio signal 112 from a signal source 110 to an audio signal of audio captured at the microphone 130 (e.g., the microphone audio signal 132 or the reduced signal 142). Based on this comparison, the echo detector 200 may determine the presence of residual echo. By determining residual echo, the echo detector 200 may collect statistics to evaluate a performance of audio components within the echo detection system 100. For example, the echo detector 200 evaluates the compatibility of a speaker-microphone combination (e.g., via the performance of the echo reducer 140). In other examples, statistics collected by the echo detector 200 evaluate algorithms corresponding to hardware and/or to software of an echo reducer 140. As an example, the echo detector 200 can evaluate an effectiveness (e.g., by amount of residual echo) of new or updated software/firmware for echo reducers 140. In other words, as RTC applications evolve or develop, the echo detector 200 may function as a feedback system for a developer, an administrator, or a user 10 of a respective RTC application.

In these examples, the echo detector 200 includes a feature extractor 300, a matcher 210 and a classifier 220. The echo detector 200 is configured to receive audio signals, such as the microphone audio signal 132, the playout audio signal 112, and/or the reduced signal 142, and to determine via the matcher 210 whether a match 212 occurs between the received audio signals. The echo detector 200 determines whether a match 212 exists by using features 302, 302*a-n* (where n is the number of features) generated by the feature extractor 300. Based on the generated features 302, 302*a-n*, the matcher 210 determines whether a match 212 occurs between a first feature 302, 302*a* of an audio signal (e.g., the microphone audio signal 132 or the reduced signal 142) and a second feature 302, 302*b* of the playout audio signal 112. With the match 212, the classifier 220 is configured to determine a likelihood 202 that the audio signals corresponding to the match 212 are an echo. In other words, a match 212 between the first feature 302, 302*a* of the microphone audio signal 132 (or the reduced audio signal 142) and the second feature 302, 302*b* of the playout audio signal 112 indicates that a portion of the playout audio signal 112 received by the microphone 132 was likely an echo. In some examples, when a match 212 occurs, the classifier 220 determines a delay value 222 between the first feature 302*a* and the second feature 302*b* to help determine the likelihood 202 that the audio signals corresponding to the match 212 are an echo. In these examples, when no match 212 occurs, the classifier 220 takes no action to determine the delay value 222. For instance, a single match 212 may not be enough evidence to conclude that an echo exists and the delay value 222 enables the classifier 220 to identify more than one match 212 with a respective delay value 222 and to conclude an increased likelihood 202 that an echo is present. The delay value may also help distinguish matches 212 that are caused by echo (e.g., exhibit the same delay value 222) or accidental matches 212 (e.g., that vary in delay values 222). In some examples, the delay value 222 additionally provides statistical analysis for the echo detection system 100 such that the user 10 and/or an administer of the echo detection system 100 may correct or modify the echo detection system 100 (e.g., via the echo reducer 140). In a simplified version of the echo detector 200, the echo detector 200 does not include a classifier 220 such that a match 212 by the matcher 210 indicates an echo without much further analysis.

With further reference to FIGS. 2A and 2B, the echo detector 200 includes a first feature extractor 300, 300a and a second feature extractor 300, 300b. The first feature extractor 300a receives the playout audio signal 112 and generates features $302a_{1-n}$ corresponding to the playout audio signal 112 (also referred to as playout features $302a_{1-n}$) while the second feature extractor 300b receives the microphone audio signal 132 (or reduced signal 142) and generates features $302b_{1-n}$ corresponding to the microphone audio signal 132 and/or the reduced signal 142 (also referred to as microphone features $302b_{1-n}$). As shown by the dotted line, the first extractor 300a and the second extractor 300b may be a single feature extractor 300. In other configurations, the echo detector 200 includes any number of feature extractors 300 to contemporaneously process features 302 in order to provide echo detection in real-time for the echo detection system 100.

FIG. 2B is similar to FIG. 2A except that the classifier 220 includes an echo threshold 224. Here, the classifier 220 additionally determines whether the delay value 222 between the first feature 302a and the second feature 302b satisfies the echo value threshold 224. In this sense, the echo threshold 224 is predictive of a respective echo, such that the echo threshold 224 indicates an echo when multiple matches 212 exhibit the same or similar delay values 222. For example, the echo threshold 224 represents a count of a delay value 222 such that the count is a minimum number of times a delay value 222 may be present before confidently predicting a delay value 222 of a match 212 corresponds to a respective echo. Put differently, when the count of the delay value 222 satisfies (e.g., is greater than or equal to) the echo threshold 224, the count satisfies a minimum number of times a delay value 222 may be present to predict a respective echo. In some implementations, the echo threshold 224 is a number of recent matching features 302 that corresponds to the most frequent delay value. Here, the most frequent delay value may be indicated by a delay histogram 226 that tracks delay values 222 corresponding to a match 212. In some configurations, the echo threshold 224 is predetermined to evidence a designed confidence interval. In other configurations, the echo threshold 224 is dynamic to track the delay values 222 or delay histogram 226.

The example of FIG. 2B shows the echo detection system 100 having an acceptable amount of time delay such as, for example, a communication lag between components of the system 100. When the system 100 has an acceptable amount of time delay, the echo threshold 224 enables the system 100 to prevent a false indication of an echo. For example, when the delay value 222 does not satisfy the echo threshold 224, the echo detector 200 does not indicate a match 212 as an echo. Thereby, the classifier 220 may require the delay value 222 to satisfy the echo threshold 224 before the echo detector 200 indicates an echo. In some examples, the echo threshold 224 may be based on historical trends or data identifying delay values 222 associated with the presence of an echo (e.g., predictive models such as machine learning models or neural networks models).

Additionally or alternatively, the matcher 210 includes a feature database 214. The feature database 214 stores features 302, $302_{1-n}$ generated by the feature extractor 300 for the matcher 210. With the feature database 214, stored features 302, $302_{1-n}$ generated by the feature extractor 300 (e.g., from the playout audio signal 112) may be evaluated via the matcher 210 for a match 212. In some examples, the feature database 214 stores only a finite amount of features $302_{1-n}$ corresponding to the playout audio signal 112 (e.g., a recent history of the playout audio signal 112) to account for delays within the system 100 (e.g., as shown in FIGS. 2A and 2B by the dotted arrow into the feature database 214). Namely, the echo detector 200 may receive the playout audio signal 112 prior to the audio playout device 120 generating the playout audio 122 from the playout audio signal 112. When this occurs, the feature database 214 may be configured to store a sufficient number of features $302_{1-n}$ from the playout audio signal 112 to compare the microphone audio signal 132 (or reduced signal 142) in real-time (e.g., as the microphone 130 generates the microphone audio signal 132). For example, if there is a 100 millisecond delay between when the feature extractor 300 generates the feature 302a of the playout audio signal 112 and when the feature extractor 300 generates the feature 302b of the microphone audio signal 132 (or reduced signal 142), the feature database 214 stores at least two seconds of features $302a_{1-n}$ of the playout audio signal 112. Although the echo detector 200 may include the feature database 214, the feature database 214 does not require internet access (e.g., function as a server database). Accordingly, the echo detector 200 does not need an internet connection to operate and thereby can function without an internet connection.

In other examples, the feature database 214 is configured to store only a finite amount of features $302_{1-n}$ corresponding to recent features of the playout audio signal 112. In other words, the feature database 214 is configured to be a recent feature collection where recent refers to the fact that features that are older than a maximum delay are discarded (e.g., in a first-in, first-out manner). In some implementations, the echo detector 200 removes features 302 that match and/or fail to be a match 212 to minimize or eliminate requirements for storage at the echo detector 200.

FIGS. 3A-3D are examples of the feature extractor 300. The feature extractor 300 is configured to receive the playout audio signal 112, the microphone audio signal 132, or the reducer signal 142 (i.e. collectively referred to as "the audio signal") and to generate the features 302 corresponding to the received audio signal. The feature extractor 300 includes a downsampler 310, a signal processor 320, a peak detector 330, and a feature generator 340.

The downsampler 310 is configured to modify the received audio signal by lowering a sampling rate or a sample size of the audio signal. In other words, the downsampler 310 generates a down-sampled signal 312 from the received audio signal. Each of the playout audio signal 112, the microphone audio signal 132, and the reducer signal 142 may be down-sampled by the downsampler 310. Downsampling often reduces an amount of samples associated with an audio signal to accommodate for restrictions related to bandwidth or audio formats size. Here, for example, the downsampler 310 reduces the received audio signal to 8 kHz. Optionally, when the feature extractor 300 is not constrained by sampling size and/or sampling rate, the feature extractor 300 may bypass or operate without the downsampler 310. In other examples, the downsampler 310 allows the feature extractor 300 to maintain a constant number for the features 302, $302_{1-n}$.

Figure 3A:
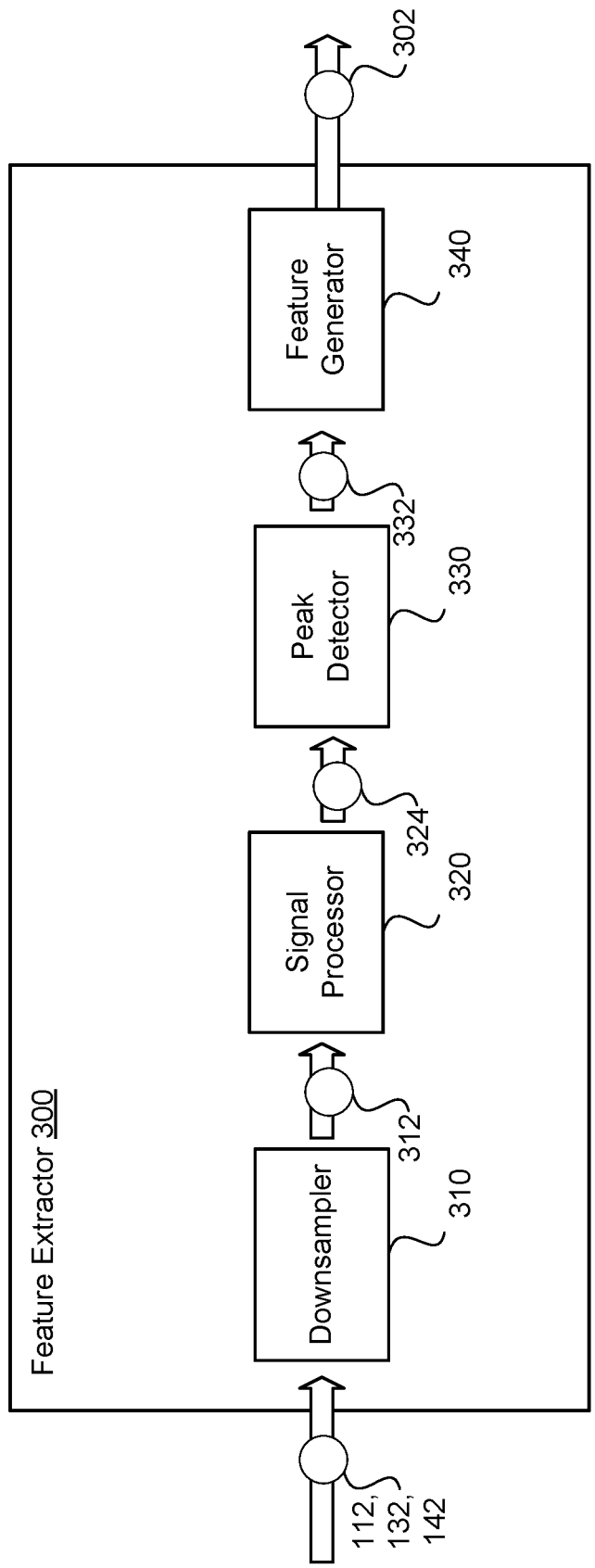
FIGS. 3A-3D are schematic views of example feature extractors of an echo detector operating within the echo detection system.
Figure 3B:
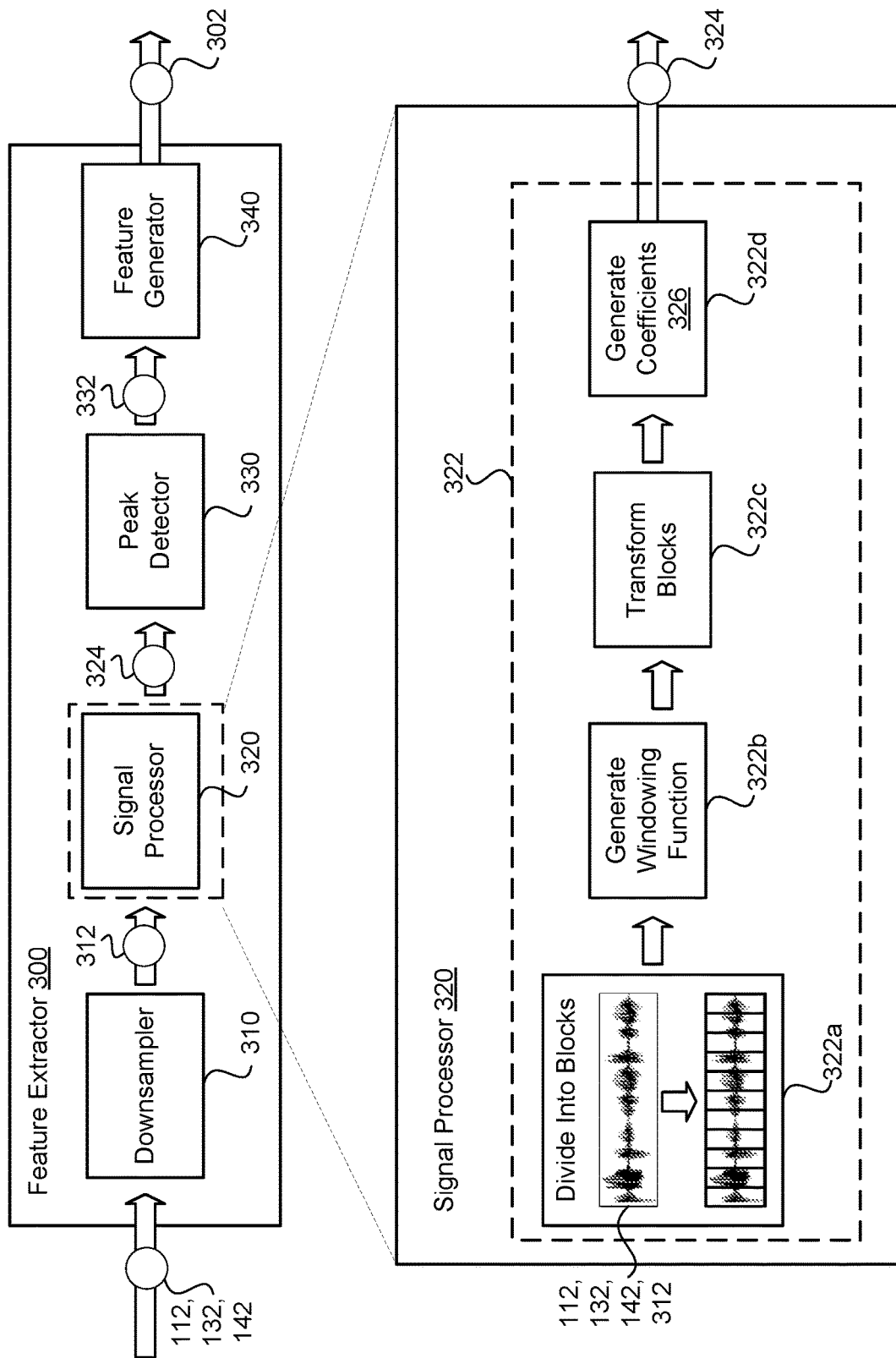

As shown by FIG. 3B, the signal processor 320 receives the down-sampled signal 312 and proceeds to process the down-sampled signal 312 into a frequency representation 324 according to a signal processor routine 322. The frequency representation 324 is a representation of a spectrum of frequencies associated with an audio signal (e.g., the downsampled signal 312). Some examples of frequency representations 324 are spectrograms, sonographs, voiceprints, voicegrams, waterfalls, etc. Although FIG. 3B illustrates a routine 322 for generating the frequency representation 324 of the audio signal, a frequency representation 324, such as a spectrogram, may be generated by other methods and/or systems such as an optical spectrometer or a series of band-pass filters.

As illustrated by FIG. 3B, the signal processor 320 executes the signal processor routine 322 to generate the frequency representation 324 by a series of steps 322a-d. At step 322a, the signal processor 320 divides the received audio signal 112, 132, 142, 312 into blocks of a certain number of samples. For example, often the number of blocks is a power of two (e.g., 256 samples). In some configurations, the blocks have a percentage of overlap (e.g., 50% overlap) such that each block includes an overlapping percentage of the previous block. At step 322b, the samples in each block are multiplied by a windowing function. For example, a windowing function, such as a Hanning or Hamming windowing function, allows a frequency transformation to develop non-zero values over a range of frequencies. With each block multiplied by a windowing function, step 322c transforms the windowed block samples (e.g., by fast Fourier transformation (FFT), discrete Fourier Transform (DFT), Discrete Cosine Transform (DCT), wavelet transform, etc.). Here, the transform results in a set of complex numbers for the block samples. At step 322d, the signal processor 320 generates coefficients 326 of the frequency representation 324. In some examples, the signal processor 320 generates the coefficients 326 by a logarithmic function of a magnitude of the set of complex numbers resulting from the transform at step 322c. The signal processor 320 is configured to repeat the signal process method steps 322a-d for each block of samples corresponding to the received audio signal 112, 132, 142, 312. Additionally or alternatively, the signal processor 320 is configured to generate frequency representations 324 in real-time as the feature extractor 300 receives audio signals 112, 132, 142, 312.

Figure 3C:
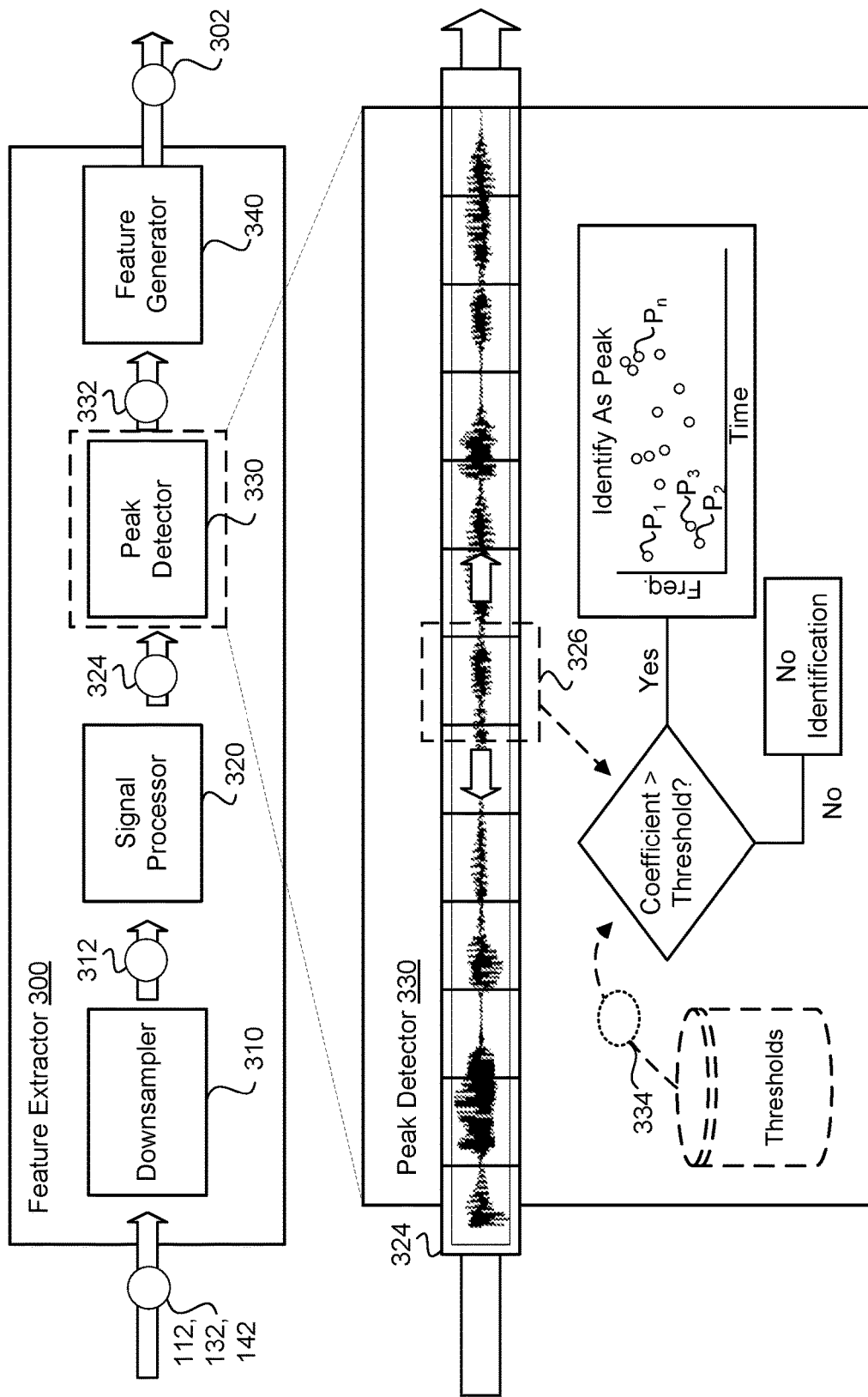

The peak detector 330 of the feature extractor 300, as shown in FIG. 3C, identifies peaks P as an output 332 among frequency representations 324 from the signal processor 320. In some examples, the peak detector 330 identifies peaks P based on the coefficients 326 of the frequency representation 324. In some configurations, the peak detector 330 includes thresholds 334 for each frequency bin generated by the signal processor 320 to form a frequency representation 324. For example, the peak detector 330 includes a threshold database for storing thresholds 334 corresponding to each frequency bin. As the peak detector 330 encounters a coefficient 326 within a frequency representation 324 that satisfies a respective threshold 334 of a frequency bin corresponding to the coefficient 326, the peak detector 330 identifies the encountered coefficient 326 as a peak P within the frequency representation 324. For example, FIG. 3C shows the peak detector 330 identifying peaks $P_1, P_2, P_3 \ldots P_n$ from coefficients 326 related to a block of the frequency representation 324.

In some implementations, the peak detector 330 operates iteratively. In other words, when the peak detector 330 identifies a peak P, the threshold 334 corresponding to the frequency bin related to the identified peak P increases. In some examples, thresholds 334 of nearby frequency bins also increase when the peak detector 330 identifies a peak P. This approach of increasing the threshold 334 may help provide certainty that the peak detector 330 accurately identifies a peak P. Additionally or alternatively, when the peak detector 330 processes a new block, thresholds 334 previously increased may decrease or return to an original threshold 334.

In some implementations, the peak detector 330 may scan the frequency representation 324 of blocks both forwards and backwards in time. When the peak detector 330 scans forwards or backwards, the peak detector 330 may add blocks to the audio signal as a means of buffering for the peak detector 330.

Figure 3D:
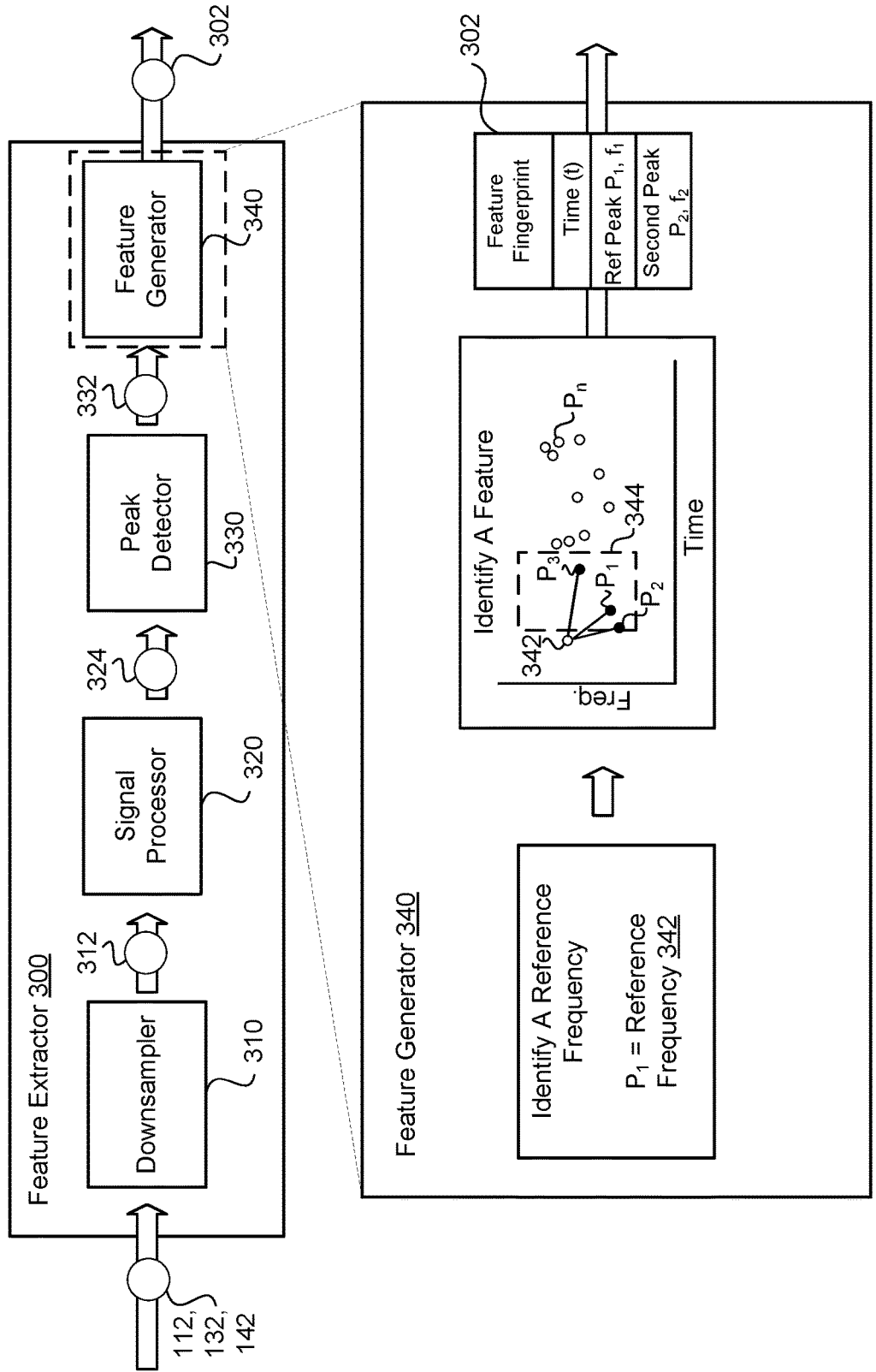

Referring to FIG. 3D, the feature generator 340 of the feature extractor 300 generates features 302. Here, the feature generator 340 generates features 302 based on peaks P identified from the frequency representation 324 by the peak detector 330. Each feature 302 may correspond to a number of frequencies f of the frequency representation 324 and a period of time t associated with the number of frequencies f. Here, for ease of explanation, each feature 302 corresponds to a pair of frequencies $f_1, f_2$ of the frequency representation 324 and a period of time t between the pair of frequencies $f_1, f_2$. For example, the pair of frequencies $f_1, f_2$ correspond to a first peak frequency $P_1, f_1$ and a second peak frequency $P_2, f_2$ of the frequency representation 324. To generate a feature 302, the feature generator 340 tries to identify a pair of peaks $P_1, P_2$ that are close in time and frequency. For instance, the first peak frequency $P_1, f_1$ and the second peak frequency $P_2, f_2$ of the frequency representation 324 may be adjacent peaks within a threshold frequency difference from each other.

In some implementations, the feature generator 340 identifies a reference frequency 342 (e.g., the first frequency $f_1$ of the pair of frequencies $f_1, f_2$) and a target zone 344. The target zone 344 represents a threshold frequency difference from the reference frequency 342. In other words, the target zone 344 constrains the second frequency $f_2$ of the pair of frequencies $f_1, f_2$ constituting the feature 302 within a frequency tolerance of the reference frequency 342. In order to constrain the second frequency $f_2$ of the pair of frequencies $f_1, f_2$, the target zone 344 spans an interval of time as well as a frequency interval. In some examples, the target zone 344 is configured as a design variable by a developer or an administrator of the echo detector 200. In other examples, the feature generator 340 determines the target zone 344 based on the coefficients 326 of the frequency representation 324.

In some implementations, the target zone 344 enables the feature generator 340 to generate a feature 302 with three values: the reference frequency 342, the second frequency $f_2$ within the target zone 344, and a time difference t between the reference frequency 342 and the second frequency $f_2$. In some implementations, these three values can be described with a limited number of bits. For examples, the frequencies 342, $f_2$ each use seven bits while the time difference t uses five bits. Accordingly, in this example, the respective feature 302 can be represented by a single 32-bit integer.

In some examples, the target zone 344 includes too many peaks $P_{1-n}$. In these examples, the target zone 344 includes an additional parameter identifying a maximum for a number of features 302 that may be generated within a given target zone 344. For example, the additional parameter identifies that the feature generator 340 only generates features 302 for the top N highest peaks where the height of a peak P corresponds to an amount of energy in a certain frequency range at a particular time. To illustrate, if N=2, then in FIG. 3D the feature generator 340 would generate a first feature 302 based on the reference frequency 342 (e.g., a height of the reference frequency) and the third peak $P_3$ as well as a second feature 302 based on the reference frequency 342 and the third peak $P_1$. In this example, the feature generator 340 would not generate a third feature 302 for the second peak $P_2$ because N=2 and the second peak $P_2$ is less than both the first peak $P_1$ and the third peak $P_3$.

Referring back to FIGS. 2A and 2B, the matcher 210 receives features 302 from the feature extractor(s) 300. In some implementations, each of the features 302 corresponds to an integer of bits as an expression of the pair of frequencies $f_1$, $f_2$ and the time difference t between the pair. When the features 302 are integers, the matcher 210 compares integers of a feature 302b from the microphone audio signal 132 (i.e. a microphone feature 302b) and a feature 302a from the playout audio signal 112 (i.e. a playout feature 302a) for equality. In some examples, the feature database 214 stores a set of playout features $302a_{1-n}$ such that the microphone feature 302b can be compared by the matcher 210 to the set of playout features $302a_{1-n}$ in real-time as the microphone 130 captures audio. Here, the set of playout features $302a_{1-n}$ may span a predetermined block of time (e.g., two seconds). By comparing against a set of playout features $302a_{1-n}$, the echo detector 200 may identify matches 212 even when the system 100 may experience communication delays or lag between components (e.g., a speaker 120 and a microphone 130) of the system 100. In these examples, if no match 212 occurs within a first set of playout features $302a_{1-n}$, a second set of playout features $302a_{1-n}$ are generated and/or retrieved from the feature database 214 for comparison to a second microphone feature 302b. In some configurations, the matcher 210 efficiently compares a set of playout features $302a_{1-n}$ with a microphone feature 302b using a hashmap, a circular buffer, or some combination of both.

FIG. 2A further illustrates an example where the classifier 220 updates a delay histogram 226 each time the matcher 210 identifies a match 212 between some portion of the playout audio signal 112 and the microphone audio signal 132. Generally speaking, a histogram is a diagram or representation of a frequency of a variable within a bin or interval. With the delay histogram 226, the classifier 220 may input the delay value 222 corresponding to a time difference between a matching microphone feature 302b and playout feature 302a. The delay histogram 226 may allow the echo detector 200 to identify temporally consistent echoes. For example, the delay histogram 226 may allow the echo detector 200 to identify temporally consistent echoes using heuristic or data-driven approaches, such as machine learning. In some configurations, the classifier 220 incrementally decreases each bin of the delay histogram 226 for each time interval where the echo detector 200 fails to detect an echo. Since the echo detector 200 may provide feedback to the system 100 and/or the echo reducer 140, the delay histogram 226 may, over time, measure an effectiveness of that feedback. By incrementally decreasing each bin of the delay histogram 226 when no echo has been recognized in a given time interval, the delay histogram 226 is capable of representing a growing effectiveness in echo reduction over time (e.g., or, conversely, a growing ineffectiveness). The time interval to incrementally decrease each bin may be a design parameter of the echo detector 200 or an adjustable parameter controlled by an administrator or user 10 of the echo detector 200.

Different configurations of the echo detector 200 may be used where the functionality of the feature extractor 300, the matcher 210, and the classifier 220 may be combined, further separated, distributed, or interchanged. Furthermore, the echo detector 200 may be implemented in a single device or distributed across multiple devices.

Figure 4:
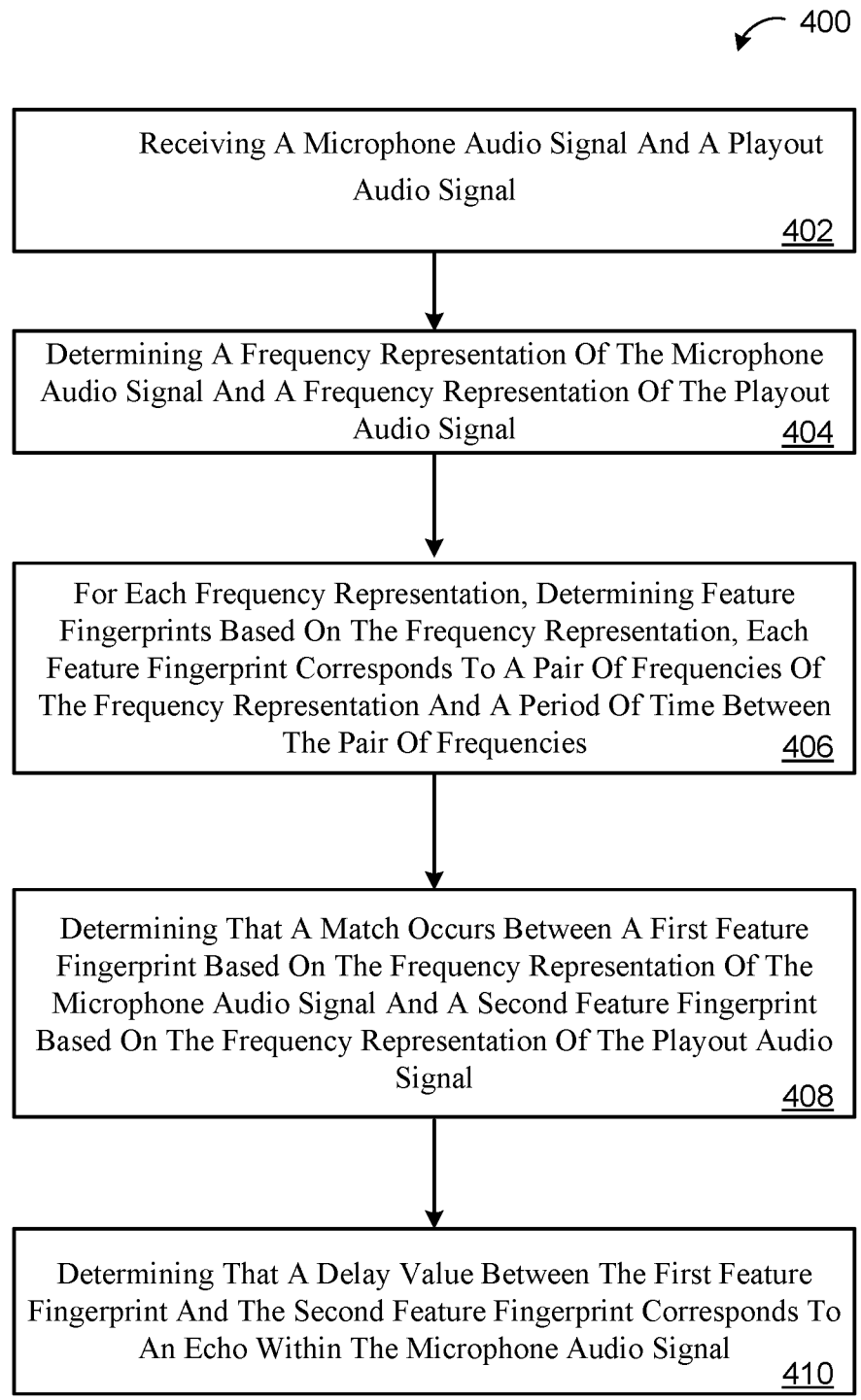
FIGS. 4 and 5 are flow diagrams of example methods of detecting echo within an echo detection system.

FIG. 4 is a flowchart of an example of a method 400 for determining an echo. The flowchart starts at operation 402 by receiving a microphone audio signal 132 and a playout audio signal 112. At operation 404, the method 400 includes determining a frequency representation 324 of the microphone audio signal 132 and a frequency representation 324 of the playout audio signal 112. At operation 406, the method 400 further includes, for each frequency representation 324, determining features 302 based on the frequency representation 324. Each feature 302 corresponds to a pair of frequencies $f_1$, $f_2$ of the frequency representation 324 and a period of time t between the pair of frequencies $f_1$, $f_2$. At operation 408, the method 400 also includes determining that a match 212 occurs between a first feature 302b based on the frequency representation 324 of the microphone audio signal 132 and a second feature 302a based on the frequency representation 324 of the playout audio signal 112. At operation 410, the method 400 further includes determining that a delay value 222 between the first feature 302b and the second feature 302a corresponds to an echo within the microphone audio signal 132. For example, the method 400 may determine the delay value 222 with respect to the delay histogram 226.

Figure 5:
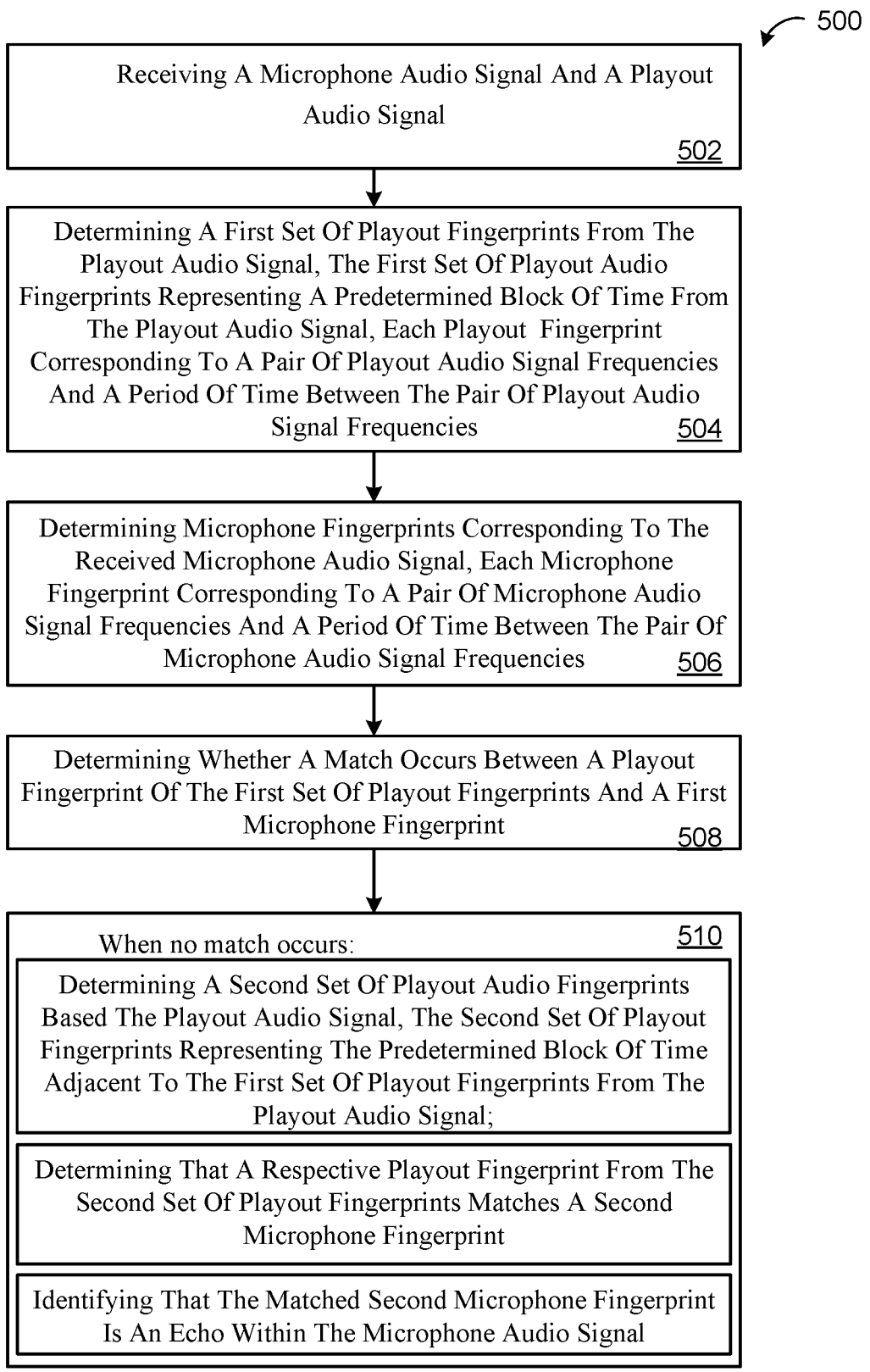

FIG. 5 is a flowchart of an example method 500 for determining an echo in real-time based on a set of features 302. At operation 502, the method 500 includes receiving a microphone audio signal 132 and a playout audio signal 112. At operation 502, the method 500 further includes determining a first set of playout features $302a_{1-n}$ from the playout audio signal 112. Here, the first set of playout features $302a_{1-n}$ represents a predetermined block of time from the playout audio signal 112. Each playout feature 302a corresponds to a pair of playout audio signal frequencies $f_1$, $f_2$ and a period of time t between the pair of playout audio signal frequencies $f_1$, $f_2$. At operation 506, the method 500 also includes determining microphone features $302b_{1-n}$ corresponding to the received microphone audio signal 132. Each microphone feature 302b corresponds to a pair of microphone audio signal frequencies $f_1$, $f_2$ and a period of time t between the pair of microphone audio signal frequencies $f_1$, $f_2$.

At operation 508, the method 500 includes determining, whether a match 212 occurs between a playout feature 302a of the first set of playout features $302a_{1-n}$ and a first microphone feature 302b. At operation 510, when no match 212 occurs, the method 500 performs the following functions. The method 500 determines a second set of playout audio features $302a_{1-n}$ based the playout audio signal 112. In this instance, the second set of playout features $302a_{1-n}$ represents the predetermined block of time adjacent to the first set of playout features $302a_{1-n}$ from the playout audio signal 112. The method 500 determines that a respective playout feature 302a from the second set of playout features $302a_{1-n}$ matches a second microphone feature 302b. The method 500 further identifies that the matched second microphone feature 302b is an echo within the microphone audio signal 132.

Figure 6:
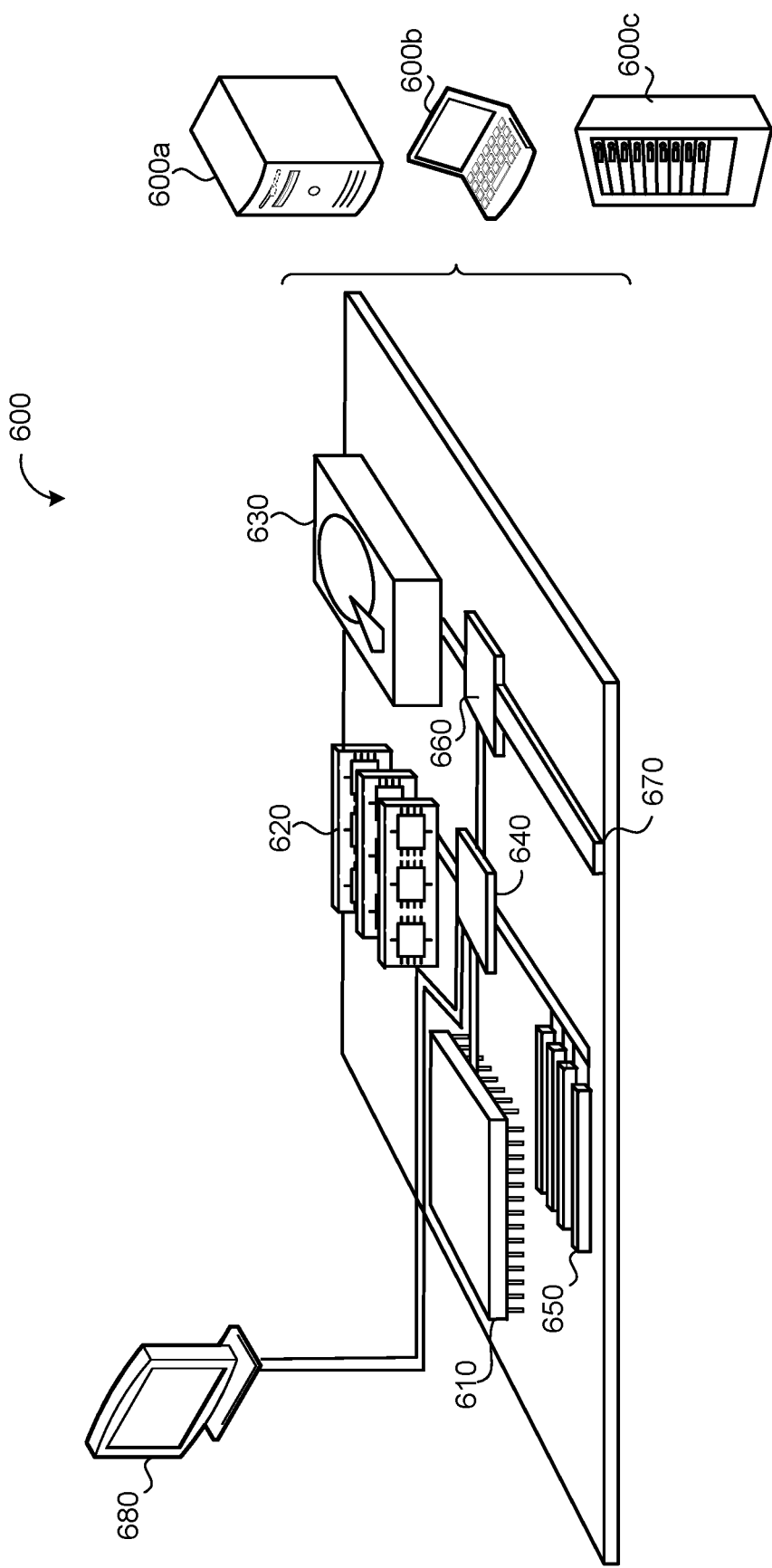
FIG. 6 is a schematic view of an example computing device that may be used to implement the systems and methods described herein.

FIG. 6 is schematic view of an example computing device 600 that may be used to implement the systems and methods described in this document. For example, the computer device 600 may be used to implement the echo detector 200 and/or the echo reducer 140 and methods related to the echo detector 200 and/or echo reducer 140. The computing device 600 is intended to represent various forms of digital computers, such as mobile phones (e.g., smart phones) laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (e.g., data processing hardware), memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented echo detection method when executed by data processing hardware causes the data processing hardware to perform operations comprising:
    receiving a frequency representation of a playout audio signal corresponding to a microphone audio signal;
    determining features based on the frequency representation of the playout audio signal, each feature corresponding to a pair of frequencies of the frequency representation of the playout audio signal and a period of time between the pair of frequencies, each corresponding pair of frequencies comprising a respective first frequency and a respective second frequency, the respective first frequency different than the respective second frequency;
    determining that a match occurs between a first feature based on a frequency representation of the microphone audio signal and a second feature based on the frequency representation of the playout audio signal; and
    determining that an echo within the microphone audio signal exists when a delay value between the first feature and the second feature satisfies an echo value threshold that is predictive of a respective echo being human perceptible.

2. The echo detection method of claim 1, wherein the echo value threshold corresponds to an echo within the microphone audio signal when multiple matches exhibit the same or similar delay values.

3. The echo detection method of claim 1, wherein determining that an echo within the microphone audio signal exists comprises determining that the delay value between the first feature and the second feature satisfies an echo count threshold representing a count of a particular delay value predictive of a respective echo.

4. The echo detection method of claim 1, wherein the respective first frequency corresponds to a first peak frequency of the frequency representation and the respective second frequency corresponds to a second peak frequency of the frequency representation, the second peak frequency adjacent to the first peak frequency and within a threshold frequency difference from the first peak frequency, the threshold frequency difference corresponding to a frequency tolerance from the first peak frequency.

5. The echo detection method of claim 1, further comprising receiving the microphone audio signal as an echo reduced signal from an echo reduction device, the echo reduction device configured to reduce echo between the microphone audio signal and the playout audio signal.

6. The echo detection method of claim 5, wherein each of the received microphone audio signal and the received playout audio signal is down-sampled.

7. The echo detection method of claim 1, wherein at least one of the frequency representation of the microphone audio signal or the playout audio signal is determined by:
    dividing the audio signal into sample blocks; and
    determining coefficients of the frequency representation based on a frequency transformation of each sample block.

8. The echo detection method of claim 1, wherein each corresponding pair of frequencies that corresponds to each feature satisfies a feature frequency threshold.

9. The echo detection method of claim 1, wherein the echo within the microphone audio signal is occurring contemporaneously in real-time.

10. The echo detection method of claim 1, further comprising removing the playout audio signal based on determining that the echo within the microphone audio signal exists.

11. An echo detection system comprising:
    data processing hardware; and
    memory hardware in communication with the data processing hardware, the memory hardware storing instructions that when executed on the data processing hardware cause the data processing hardware to perform operations comprising:
        receiving a frequency representation of a playout audio signal corresponding to a microphone audio signal;
        determining features based on the frequency representation of the playout audio signal, each feature corresponding to a pair of frequencies of the frequency representation of the playout audio signal and a period of time between the pair of frequencies, each corresponding pair of frequencies comprising a respective first frequency and a respective second frequency, the respective first frequency different than the respective second frequency;
        determining that a match occurs between a first feature based on a frequency representation of the microphone audio signal and a second feature based on the frequency representation of the playout audio signal; and determining that an echo within the microphone audio signal exists when a delay value between the first feature and the second feature satisfies an echo value threshold that is predictive of a respective echo being human perceptible.

12. The echo detection system of claim 11, wherein the echo value threshold corresponds to an echo within the microphone audio signal when multiple matches exhibit the same or similar delay values.

13. The echo detection system of claim 11, wherein determining that an echo within the microphone audio signal exists comprises determining that the delay value between the first feature and the second feature satisfies an echo count threshold representing a count of a particular delay value predictive of a respective echo.

14. The echo detection system of claim 11, wherein the respective first frequency corresponds to a first peak frequency of the frequency representation and the respective second frequency corresponds to a second peak frequency of the frequency representation, the second peak frequency adjacent to the first peak frequency and within a threshold frequency difference from the first peak frequency, the threshold frequency difference corresponding to a frequency tolerance from the first peak frequency.

15. The echo detection system of claim 11, wherein the operations further comprise receiving the microphone audio signal as an echo reduced signal from an echo reduction device, the echo reduction device configured to reduce echo between the microphone audio signal and the playout audio signal.

16. The echo detection system of claim 15, wherein each of the received microphone audio signal and the received playout audio signal is down-sampled.

17. The echo detection system of claim 11, wherein at least one of the frequency representation of the microphone audio signal or the playout audio signal is determined by:
dividing the audio signal into sample blocks; and
determining coefficients of the frequency representation based on a frequency transformation of each sample block.

18. The echo detection system of claim 11, wherein each corresponding pair of frequencies that corresponds to each feature satisfies a feature frequency threshold.

19. The echo detection system of claim 11, wherein the echo within the microphone audio signal is occurring contemporaneously in real-time.

20. The echo detection system of claim 11, wherein the operations further comprise removing the playout audio signal based on determining that the echo within the microphone audio signal exists.

* * * * *